US012785802B2

(12) United States Patent
Almonacil et al.

(10) Patent No.: US 12,785,802 B2
(45) Date of Patent: Nov. 3, 2026

(54) POINT-TO-POINT OPTICAL COMMUNICATION VIA A FREE SPACE LINK

(71) Applicant: Nokia Solutions and Networks Oy, Espoo (FI)

(72) Inventors: Sylvain Almonacil, Massy (FR); Rajiv Boddeda, Massy (FR); Sebastien Bigo, Massy (FR); Jeremie Renaudier, Massy (FR)

(73) Assignee: Nokia Solutions and Networks Oy, Espoo (FI)

(*) Notice: Subject to any disclaimer, the term of this patent is extended or adjusted under 35 U.S.C. 154(b) by 411 days.

(21) Appl. No.: 18/474,391

(22) Filed: Sep. 26, 2023

(65) Prior Publication Data

US 2024/0129044 A1 Apr. 18, 2024

(30) Foreign Application Priority Data

Oct. 14, 2022 (EP) .................................... 22306566

(51) Int. Cl.
*H04B 10/11* (2013.01)

(52) U.S. Cl.
CPC .................................. *H04B 10/11* (2013.01)

(58) Field of Classification Search
CPC ...... H04B 10/11; H04B 10/112; H04B 10/118
See application file for complete search history.

(56) References Cited

U.S. PATENT DOCUMENTS 7,224,720 B2 5/2007 Oishi et al.
2003/0215176 A1 11/2003 Britz et al.
2005/0005225 A1 1/2005 Johnson et al.
2009/0116518 A1 5/2009 Patel et al.
2014/0248058 A1 9/2014 Simpson et al.
2017/0317750 A1 11/2017 Chaffee et al.
2021/0242944 A1 8/2021 Chaffee et al.

FOREIGN PATENT DOCUMENTS

CN 111769880 A 10/2020

OTHER PUBLICATIONS

Roy et al., "Optical feeder links for high throughput satellites", IEEE International Conference on Space Optical Systems and Applications (ICSOS), Oct. 26-28, 2015, pp. 1-6.

(Continued)

*Primary Examiner* — Thomas A Hollweg

(74) *Attorney, Agent, or Firm* — Mendelsohn Dunleavy, P.C.; Steve Mendelsohn

(57) ABSTRACT

An apparatus comprises an optical data receiver to receive first and second data-modulated optical carriers in different wavelength bands via a free space optical link and to generate an output digital data stream from demodulated segments of the first and second data-modulated optical carriers. The optical data receiver is configured to make selections between temporally corresponding portions of the first and second data-modulated optical carriers for generating successive portions of the output digital data stream. The optical data receiver is configured to make one of the selections between two of the temporally corresponding portions of the first and second data-modulated optical carriers based on at least one value of a quality indicator obtained for at least one of two temporally corresponding portions.

16 Claims, 10 Drawing Sheets

(56) References Cited

OTHER PUBLICATIONS

Churnside, "Aperture averaging of optical scintillations in the turbulent atmosphere", Applied Optics, vol. 30, No. 15, 1991, pp. 1982-1994.
Trisno et al., "Delayed diversity for fade resistance in optical wireless communications through turbulent media", Proceedings vol. 5596, Optical Transmission Systems and Equipment for WDM Networking III, Oct. 25, 2004, pp. 385-394.
Trisno et al., "Characterization of time delayed diversity to mitigate fading in atmospheric turbulence channels", Proceedings vol. 5892, Free-Space Laser Communications V, 589215, Sep. 12, 2005, pp. 589215-1-589215-10.
Popoola et al., "Error performance of terrestrial free space optical links with subcarrier time diversity", IET Communications, vol. 6, No. 5, 2012, pp. 499-506.
Extended European Search Report received for corresponding European Patent Application No. 22306566.5, dated Mar. 23, 2023, 8 pages.
Balaji et al., "Performance evaluation of FSO system using wavelength and time diversity over malaga turbulence channel with pointing errors", Optics Communications, vol. 410, Mar. 1, 2018, pp. 643-651.
Nistazakis et al., "On the use of wavelength and time diversity in optical wireless communication systems over gamma-gamma turbulence channels", Optics & Laser Technology, vol. 44, No. 7, Oct. 2012, pp. 2088-2094.
Office action received for corresponding European Patent Application No. 22306566.5, dated Sep. 23, 2025, 7 pages.
Calvo et al., "Evaluation of optical ranging and frequency transfer for the Kepler system : preliminary laboratory tests", European Navigation Conference (ENC), Nov. 23-24, 2020, pp. 1-9.
Jost et al., "Comparison of L- and C-Band Satellite-to-Indoor Broadband Wave Propagation for Navigation Applications", IEEE Transactions on Antennas and Propagation, vol. 59, No. 10, Oct. 2011, pp. 3899-3909.

POINT-TO-POINT OPTICAL COMMUNICATION VIA A FREE SPACE LINK

TECHNICAL FIELD

Various example embodiments relate generally an apparatus for decoding a digital data stream transmitted via free space via an optical signal.

BACKGROUND

Optical satellite communications via free space provide high-capacity data links in low-density populated areas that can be used to establish non-permanent data links for example for industries or military operations or can provide seamless connectivity when terrestrial networks are shut down.

However optical signals propagating through the atmosphere from/towards a satellite are impacted by air turbulence. Air turbulence randomly modifies (spatially and temporally) the optical beam profile and may cause spatio-temporal phase and amplitude variations of the optical beam. In a ground-satellite optical link, this creates received optical power fluctuations when coupling the optical beam into the receiver fiber, at the input of the satellite or ground station telescope. Thus, the signal power available for data demodulation randomly varies in time and may fall below a minimum value required for quasi error free transmission, even when sophisticated error correction engines are used.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to an aspect, an apparatus comprises: an optical data receiver to receive first and second data-modulated optical carriers in different wavelength bands via a free space optical link and to generate an output digital data stream from demodulated segments of the first and second data-modulated optical carriers; wherein the optical data receiver is configured to make selections between temporally corresponding portions of the first and second data-modulated optical carriers for generating successive portions of the output digital data stream; and wherein the optical data receiver is configured to make one of the selections between two of the temporally corresponding portions of the first and second data-modulated optical carriers based on at least one value of a quality indicator obtained for at least one of two temporally corresponding portions.

The optical data receiver may be configured to make the one of the selections in response to determining that the at least one value of the quality indicator indicates a higher quality for the portion of the selected one of the data-modulated optical carriers than for the temporally corresponding portion of the unselected one of the data-modulated optical carriers.

The optical data receiver may be configured to make one of the selections in response to estimating that a received average optical intensity of said portion of the selected one of the data-modulated optical carriers is larger than a received average intensity of said portion of the unselected one of the optical data-modulated carriers.

The optical data receiver may be configured to make the one of the selections in response to estimating that a bit error rate in said portion of the selected one of the data-modulated optical carriers is lower than a bit error rate in said temporally corresponding portion of the unselect one of the data-modulated optical carriers.

The quality indicator may be a measure of an optical power of one of the received data-modulated optical carriers. The apparatus may comprise at least one optical power detector for generating the measure of an optical power.

The optical data receiver may comprise forward error correction circuitry configured to generate indicators of decoding error for recovering digital data from the first and second data-modulated optical carriers; and the quality indicator may be determined based on said indicators of decoding error.

The optical data receiver may be configured to estimate a relative delay between the temporally corresponding portions by determining a correlation between demodulated sequences of data values.

The optical data receiver may be configured to estimate a relative delay between the temporally corresponding portions based on data packet identifiers carried by the first and second data-modulated optical carriers.

The apparatus may comprise an optical data transmitter configured to transmit the first and second data-modulated optical carriers to the free space optical link, the optical data transmitter being configured to cause the first and second data-modulated optical carriers to carry a same input digital data stream.

The optical data transmitter may be configured to transmit the temporally corresponding portions of the first and second data-modulated optical carriers to the free space optical link with a relative time delay.

BRIEF DESCRIPTION OF THE DRAWINGS

Example embodiments will become more fully understood from the detailed description given herein below and the accompanying drawings, which are given by way of illustration only and thus are not limiting of this disclosure.

Figure 2A:
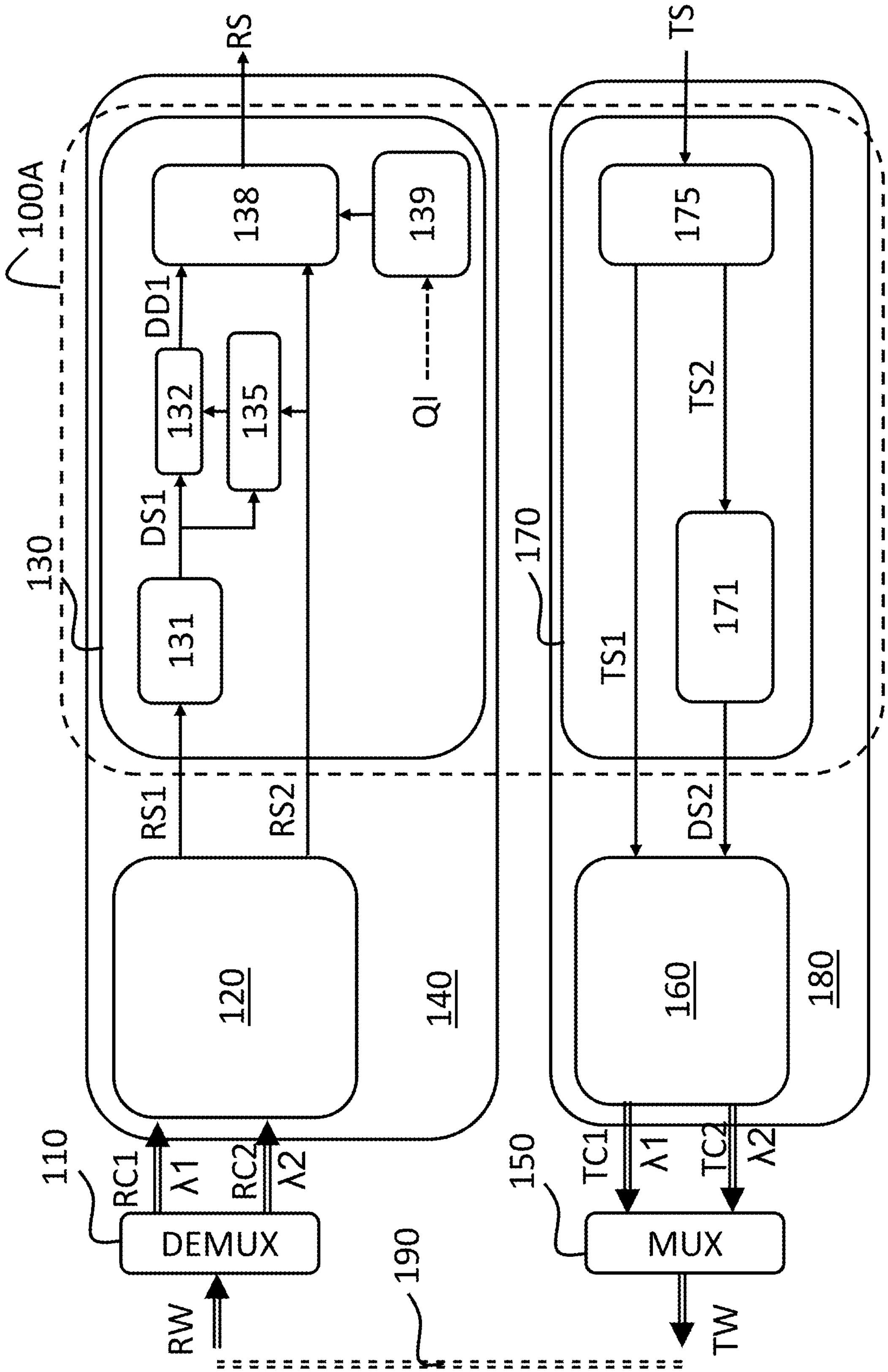
Figure 2B:
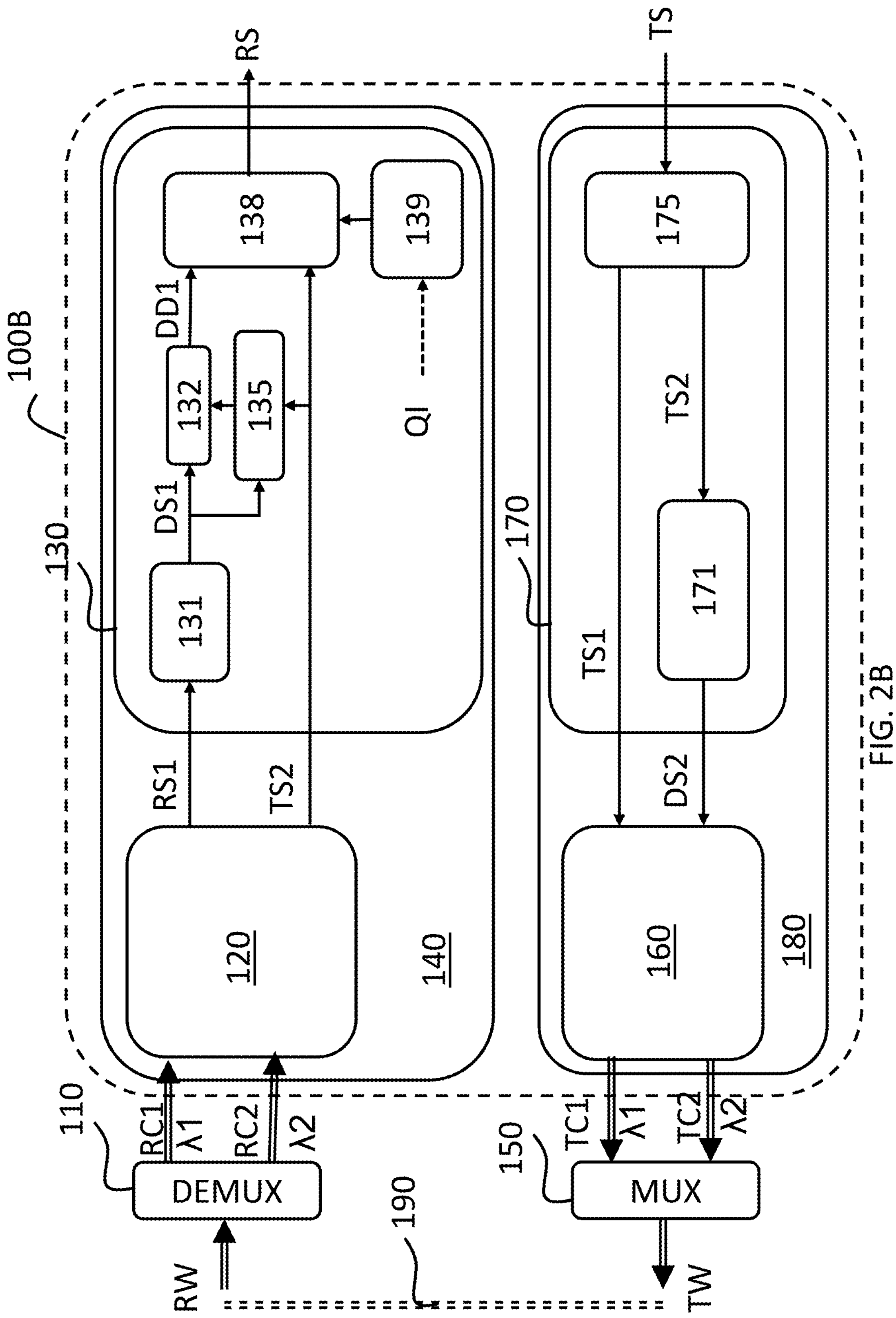
Figure 2C:
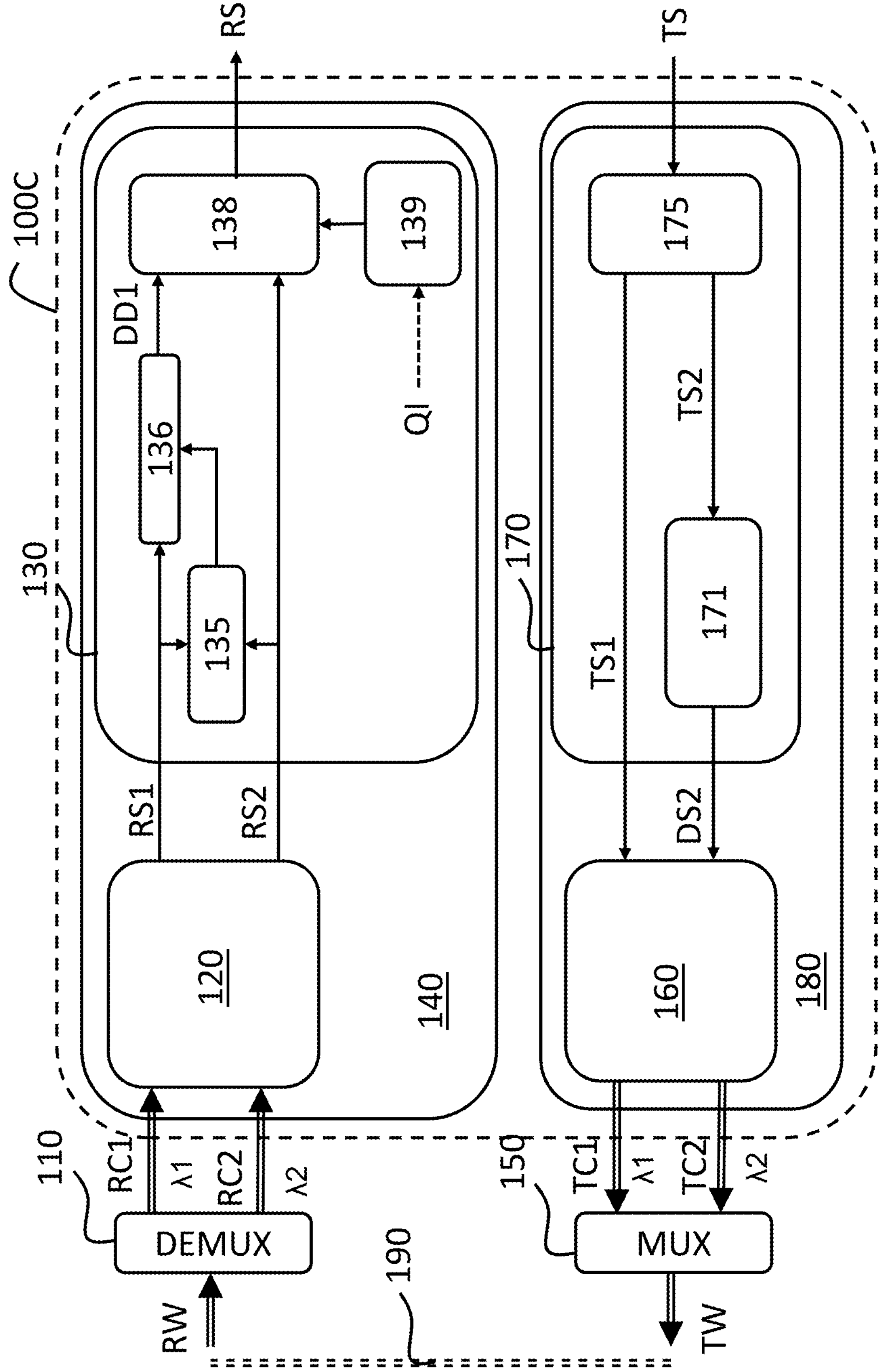

Each of FIGS. 2A-2C shows a block diagram of an apparatus for decoding a digital data stream according to an example.

Figure 3A:
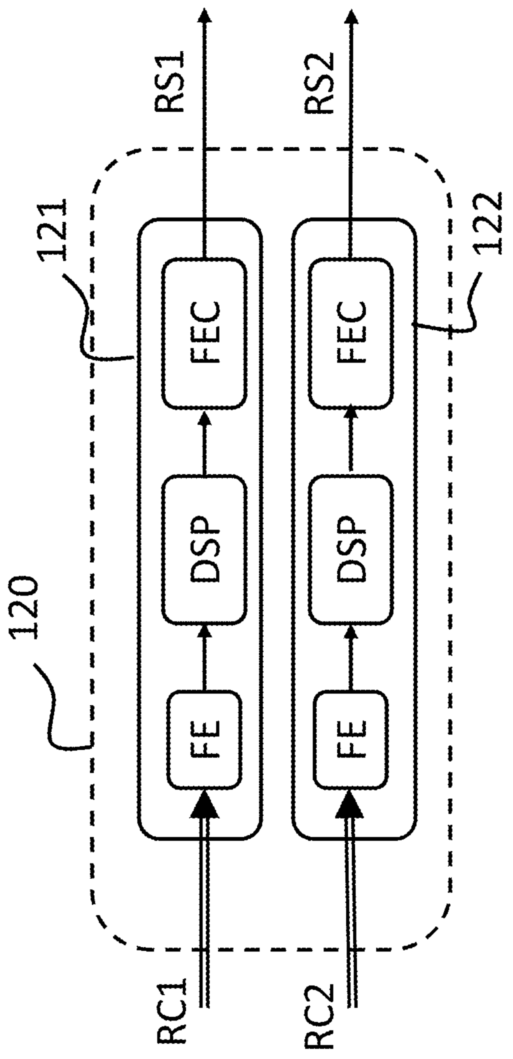
Figure 3B:
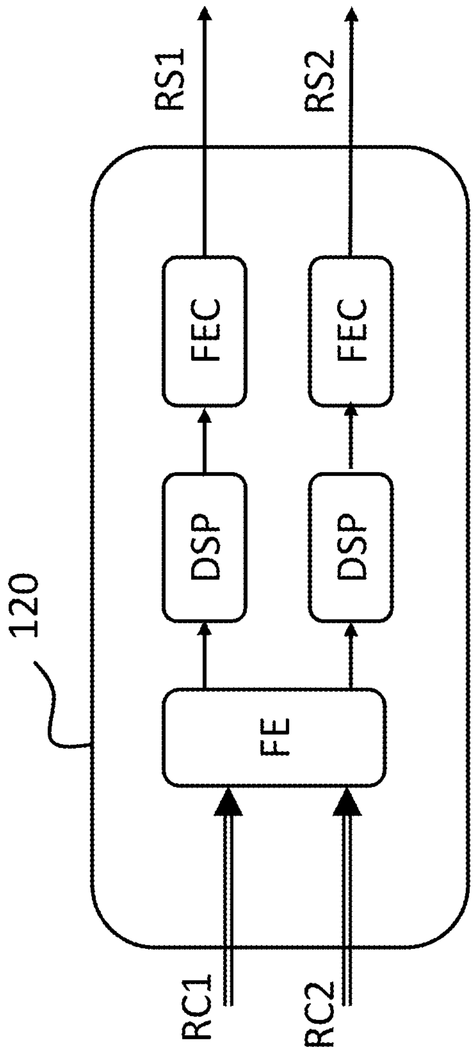

Each of FIGS. 3A-3B shows a block diagram of an optical data receiver according to an example.

Figure 4A:
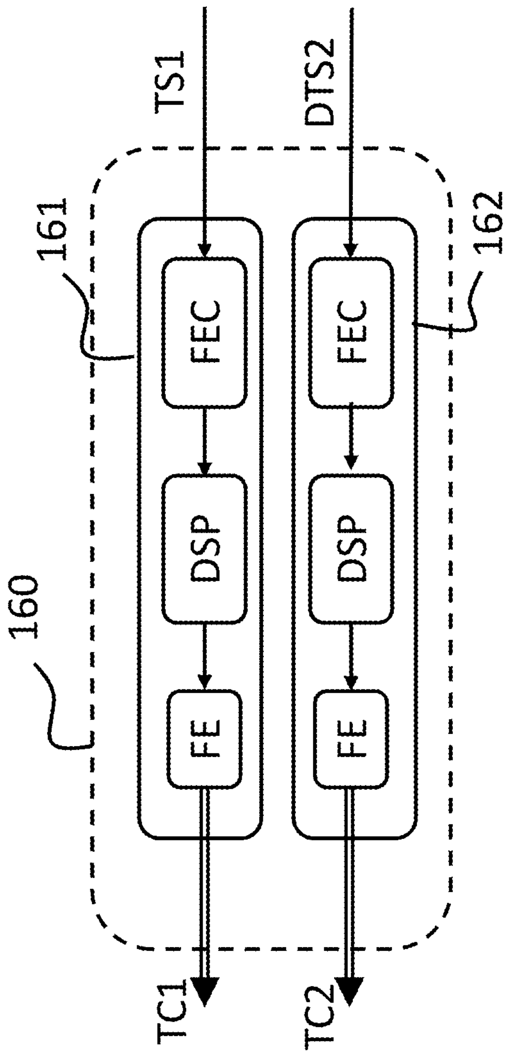
Figure 4B:
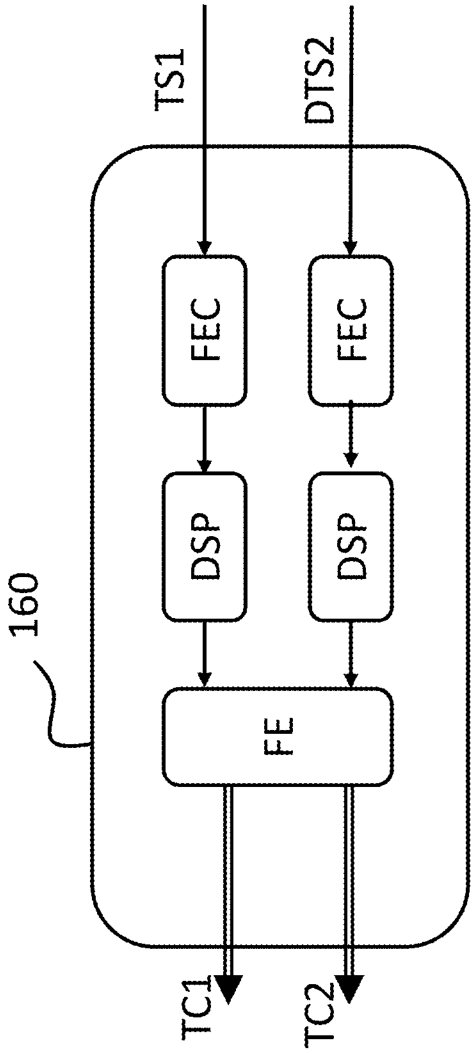

Each of FIGS. 4A-4B shows a block diagram of an optical data transmitter according to an example.

Figure 5A:
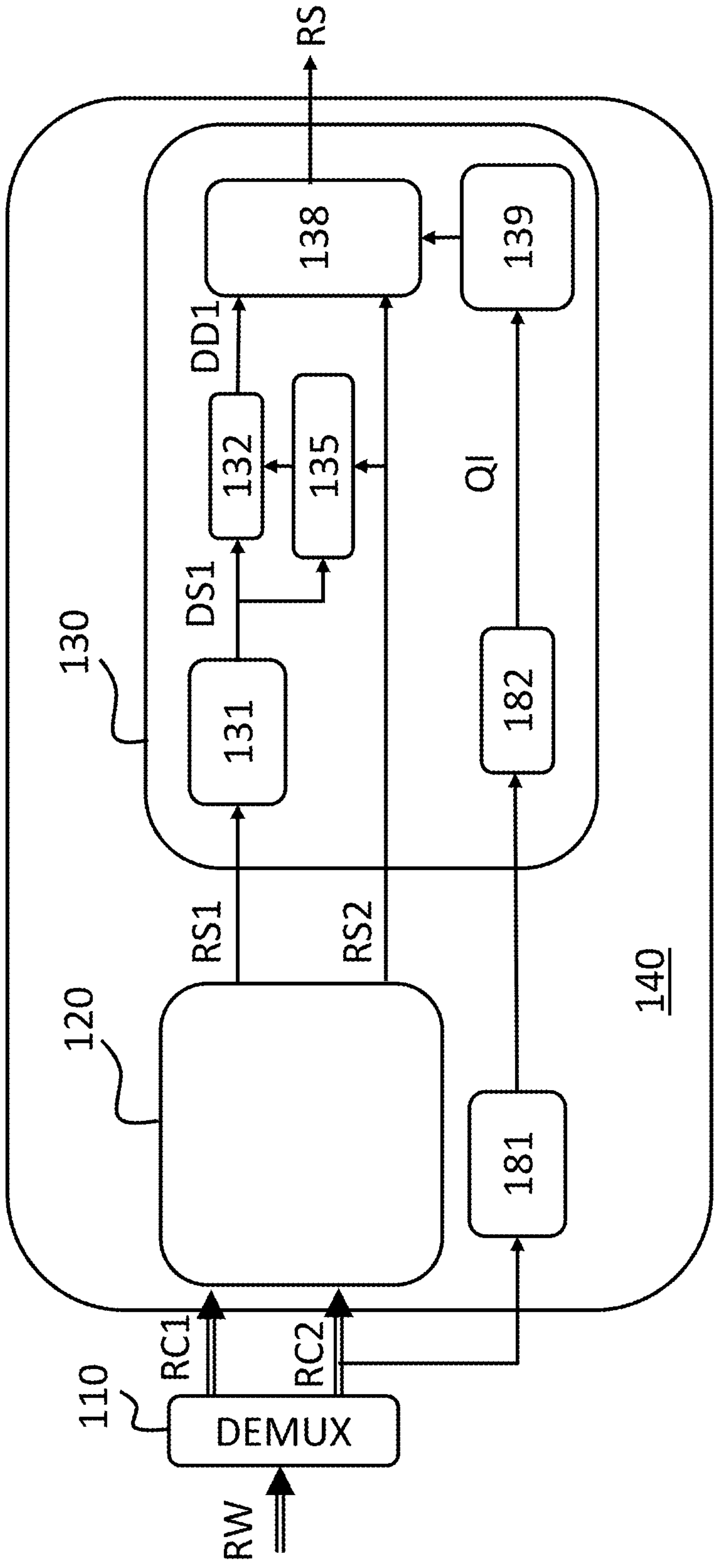
Figure 5B:
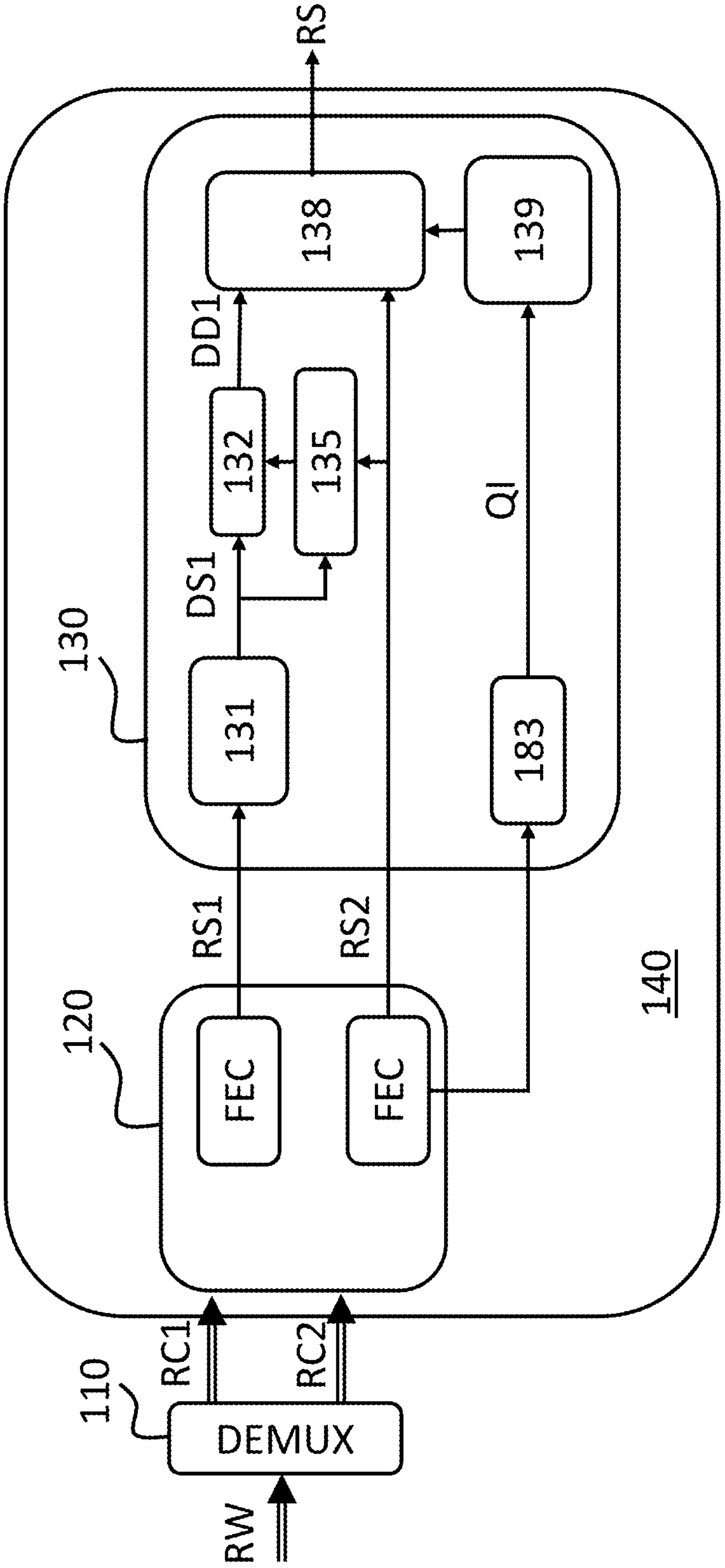
Figure 5C:
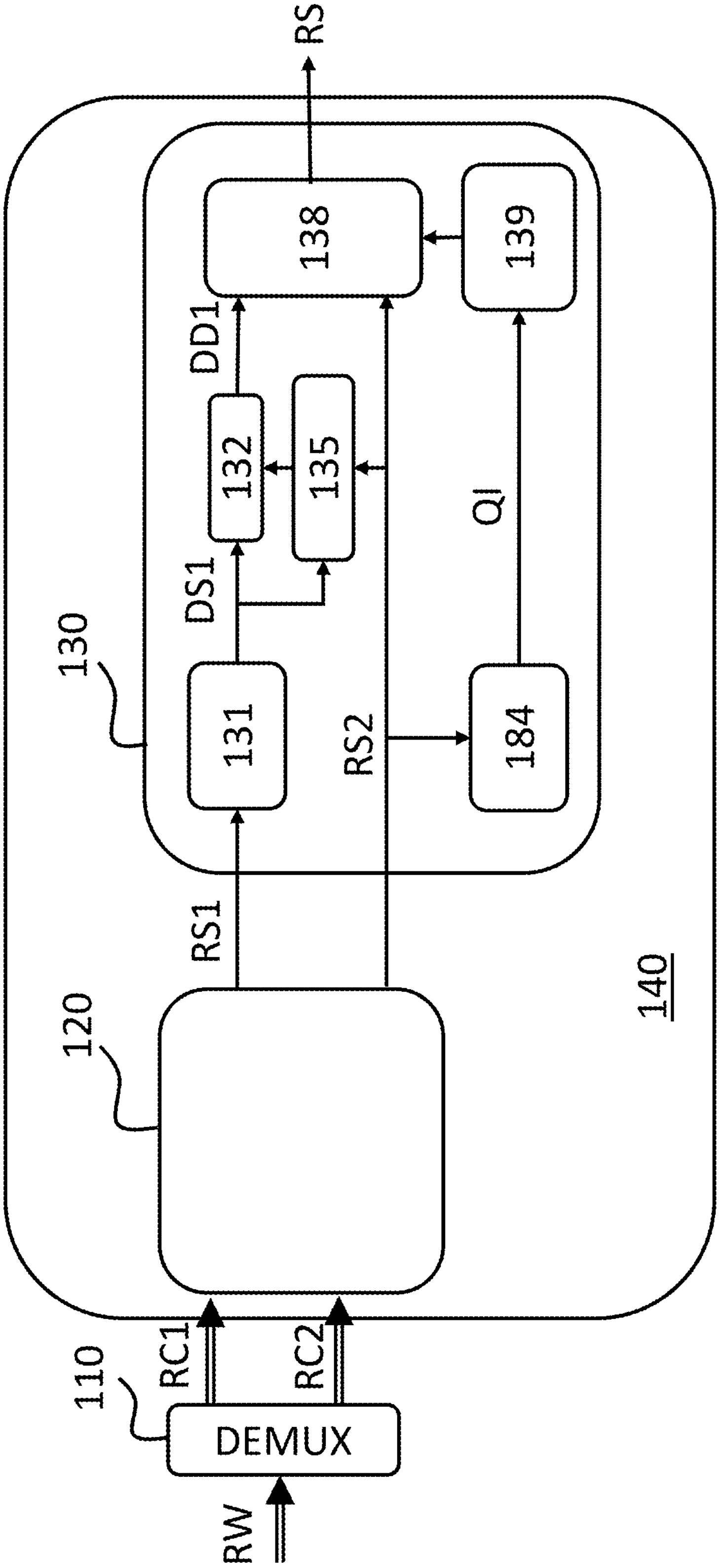

Each of FIGS. 5A-5C shows a block diagram of an apparatus for decoding a digital data stream according to an example.

Figure 6B:
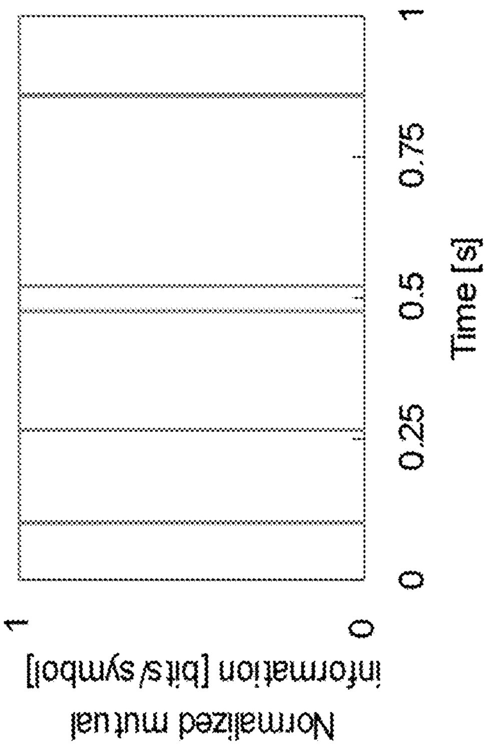
Figure 6A:
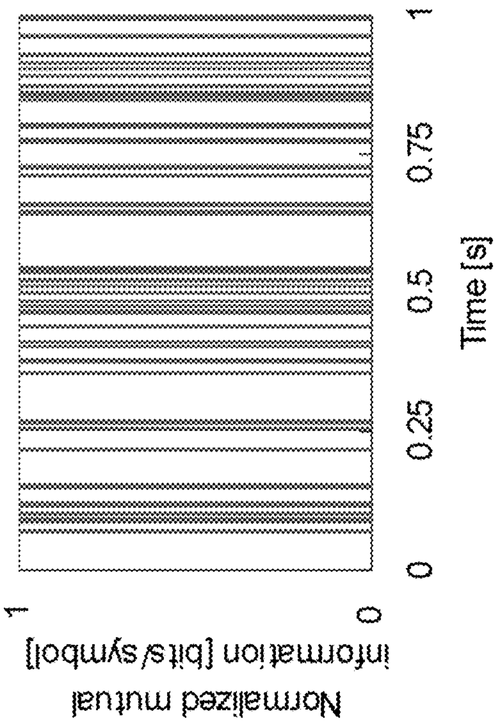

FIGS. 6A-6B include diagram illustrating aspects of the decoding of a digital data stream according to an example.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

One or more example embodiments concern an apparatus for decoding a digital data stream.

Figure 1B:
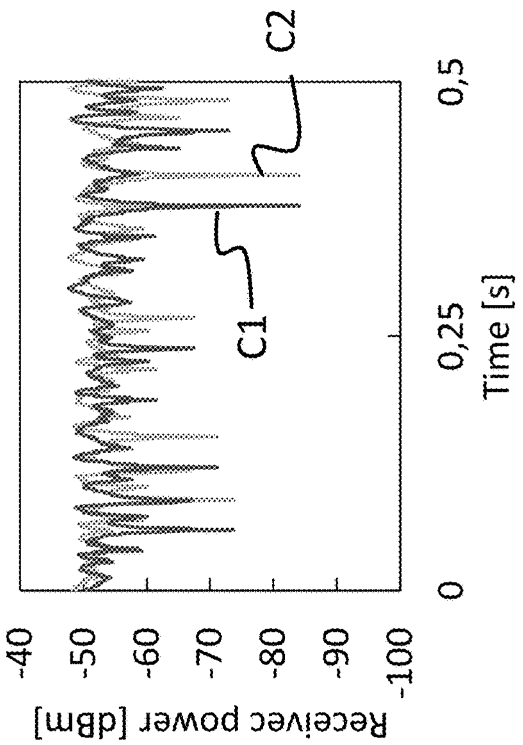
FIGS. 1A-1C shows examples of expected received optical power variations in time.
Figure 1C:
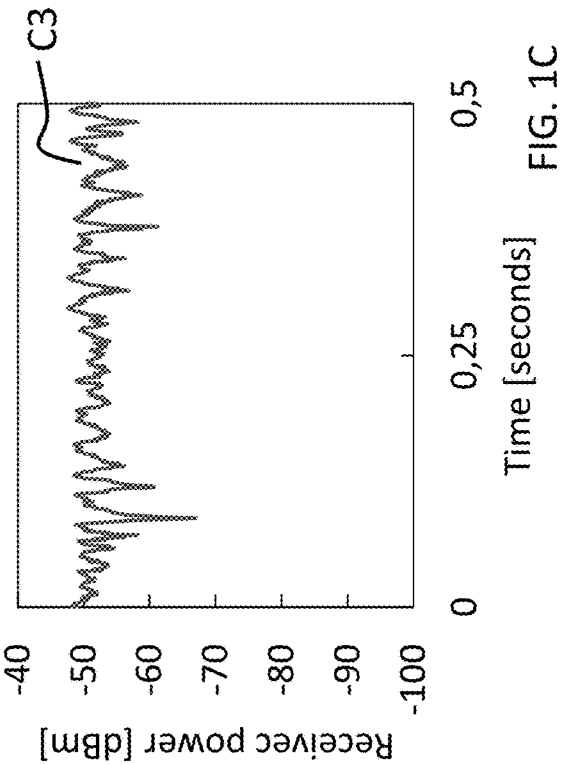
Figure 1A:
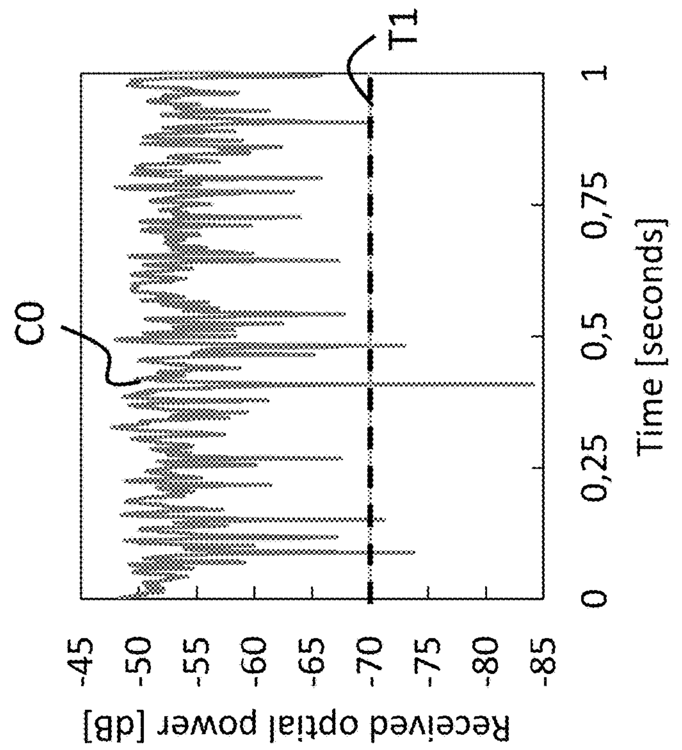

FIGS. 1A-1C illustrate the effect of the time diversity on the received optical power by selecting one of two duplicated digital data streams based on a received optical power.

FIG. 1A has a curve C0 showing received optical power as a function of time for a Ground-to-Satellite, free space, optical link, which is impacted by air turbulence. The curve C0 corresponds to typical received optical power for 2 W launched power and a ground to geostationary satellite link. A threshold (T1) may be determined such that the threshold T1 is not crossed more frequently than a target availability of 99%. In the example of FIG. 1A the threshold is −77 dBm. For systems where the detection threshold—corresponding to the threshold above which the system is operational and below which the digital data encoded in a data-modulated optical carrier cannot be decoded—is higher (e.g. −45 dBm) the optical launched power must be increased.

The effect of air turbulence on an optical signal can be modelled by a time varying attenuation of the received optical power with respect to the received optical power in the absence of such turbulence (i.e., for a static atmosphere).

For example, with a digital receiver configured for 100 Gbps transmission, the minimum required signal-to-noise ratio at the receiver is typically around 2 dB. Below this value, it is typically not possible to decode the digital data encoded in a data-modulated optical carrier.

The minimum required received optical power can be determined for a receiver. For example for a receiver EDFA (erbium-doped fiber amplifier) with ASE (Amplified Spontaneous Emission) noise as dominant impairment, the required received optical power (ROP) can be estimated with the formula:

$$\text{ROP [dBm]} = \text{SNR [dB]} - \xi\text{[dB]} - 58 + \text{NF} \quad (1)$$

where $\xi$ is a scaling factor accounting for the signal bandwidth ($\xi=12.5/R$, R is the symbol rate in Gbaud) and NF the noise figure of the EDFA. We consider a typical NF=4 dB. At a symbol rate of 56 Gbaud, we compute a required ROP of approximately −45 dBm. With a typical ground/satellite optical link budget, this requires an optical launched power of ~2 W.

This above estimation is done considering advanced error correction codes and adaptive optics pre- and post-compensation techniques. Adaptive optics consists in deformable mirrors can be used at both the transmitter and the receiver to pre- or post-compensate the beam waveform distortions.

With turbulence, if one wants at least −45 dBm of received optical power for a given fraction of the time, it may be necessary to increase the launched optical power. For instance, for a target system availability of 99%, the launched optical power must be increased by ~22 dB in the presence of air turbulence, i.e. increased by a factor of about 160, with respect to the launched optical power for a static atmosphere. Thus, with turbulence and a target availability of 99%, the required launched optical power will be in the range of ~300 W, which is unfeasible with contemporary, high (continuous) power amplifiers, for which the maximum available power is around ~30 W.

To reduce the impact of air turbulence on an optical signal propagating through the atmosphere, without increasing significantly the required optical launch power, spectral diversity is used. The input digital data stream to be transmitted is duplicated and each of the duplicated digital data streams is modulated (by one or two optical data transmitter(s)) on a different wavelength and multiplexed (e.g. using wavelength division multiplexing) in one optical signal having at least two different wavelength bands such that the duplicated digital data streams are transmitted on the same optical path. At the receiver side, each received digital data stream is independently demodulated (e.g. by one or two optical data receiver(s)).

Further, time diversity may be used by delaying, before modulation at the optical transmitter side, one of the duplicated digital data streams with respect to the other so as to transmit the duplicated digital data streams with a relative delay ΔT. The relative delay ΔT introduced by the optical transmitter may be compensated at the optical receiver side after demodulation to be able to compare temporally corresponding portions of the data-modulated optical carriers and select one of the temporally corresponding portions based on a quality indicator value determined for at least one of the temporally corresponding portions for generating the output digital data stream. The quality indicator value may be determined based on a power measurement or/and an indicator of a decoding error. The selection may be performed between corresponding segments demodulated respectively from the temporally corresponding portions of the data-modulated optical carriers.

The relative delay ΔT applied at transmitter side may be compensated by using at least one delay at receiver side, for example by using a coarse delay and fine delay. As the optical path is shared for the two directions of propagation and for the two transmitted wavelengths, the coarse delay may correspond to the relative delay ΔT applied at transmitter side.

The fine delay may be used to compensate any processing delay that may be introduced in the encoding signal processing chain, i.e., in the optical transmitter, and/or decoding signal processing chain, in the optical receiver, for any of the digital data stream. The solution may therefore be totally agnostic to the physical layer hardware elements and configuration (transceivers, modulation formats, physical line rate, forward error correction codes or other parameters).

FIG. 1B shows the effect of time diversity with two curves corresponding to the variation of the received power. A first curve C1 corresponds to the received power of a first data-modulated optical carrier at wavelength λ1 (H(λ1)=H(t)) and a second curve C2 corresponds to the received power of a second data-modulated optical carrier at wavelength λ2 (H(λ2)=H(t−ΔT), where ΔT is the relative delay). Both curves have power dips or valleys up to −40 dB. But, at least, some of the dips in received optical power do not overlap in time. Thus, selecting among the first and second data-modulated optical carriers, which are relatively delayed, allows removal of some undesired low received power intervals from the portions of optical signals used for data decoding.

By using time diversity, the availability of the optical link may be increased in the presence of turbulence since the two digital data streams propagate through the same atmospheric conditions, through the same light path, but at different instants. In other words, distinct segments of the two digital data streams will be affected by a given air turbulence at a given instant in the optical path. Thus the probability to have at least one digital data stream with sufficient received optical power for demodulation and decoding strongly increases. The relative delay ΔT that is applied may be selected to be longer than the average or maximum duration of the power dips or valleys of the received power.

As illustrated by the curve C3 of FIG. 1C, by selecting during at each time step the demodulated digital data stream with the best quality among the demodulated digital data streams to generate the decoded digital data stream, the dips or valleys the received power (curve C3) corresponding to output digital data stream can be maintained above about −70 dB. It can be seen that the power fluctuations are strongly damped, with a 15 dB reduction (from −77 dB to −62 dB) of the optical launch power in this example, corresponding to a factor of 100.

The time diversity is applied here at client layer, meaning that the digital data streams are duplicated, delayed, combined and selected in electrical (digital) domain rather than operating at the physical layer on the optical signals.

Time diversity can be implemented on a same light path by using spectral diversity. This avoids duplicating ground and satellite telescopes because the two different wavelengths can travel on similar or identical optical paths.

FIGS. 2A-2C show several examples of architecture of an apparatus for decoding a digital data stream. The apparatus includes an optical data transceiver for implementing spectral and time diversity that incorporates the optical data transmitter duplicate/delay functions and the optical data receiver delay/selection functions.

FIG. 2A shows a first embodiment of an optical data transceiver based on an add-on card 100A which can be plugged on to electrical inputs/outputs of existing optical data transceivers, including an optical data receiver 120 and an optical data transmitter 160. There may be one add-on card (corresponding in FIG. 2A to the circuitry 130) for receiver side and another physically distinct add-on card (corresponding in FIG. 2A to the circuitry 170) for the transmitter side or alternatively a single add-on card 100A for implementing the functions at receiver and transmitter side. The FIG. 2A corresponds to the second alternative. The below description is likewise applicable to the first alternative.

On optical data transmitter side, the add-on card 170 may include:

- electrical circuitry 175 for duplicating the input digital data stream TS to generate the duplicated digital data streams TS1, TS2; and
- electrical circuitry 171 for applying a relative delay ΔT to one of the duplicated digital data streams TS1, TS2 (here TS2) to generate a delayed digital data stream DS2. In some embodiments the circuitry 171 and 175 may be combined.

On optical data transmitter side, the optical data transmitter 180 (including the optical data transmitter 160 with the additional functions of the add-on card 170) is configured to produce two digital data streams (here TS1 and DS2) such that each of the data streams TS1 and DS2 carries the same stream of digital data input to the optical data transmitter. Each of the produced data streams TS1 and DS2 is used to generate a corresponding data-modulated optical carriers TC1, TC2 in a respective wavelength band. The two data-modulated optical carriers TC1, TC2 may for example be modulated around respective wavelengths λ1 and λ2. The two data-modulated optical carriers TC1, TC2 are multiplexed by an optical multiplexer 150 to generate a multiplexed optical signal TW (e.g. a wavelength division multiplexing, WDM, signal) transmitted via free space.

On the optical data receiver side, the optical data receiver 140 (including the optical data receiver 120 with the additional functions of the add-on card 130) receives multiplexed data-modulated optical signals RW (e.g. a wavelength division multiplexed optical signals) via free space and demultiplexes said optical signals in an optical demultiplexer 110 to generate two data-modulated optical carriers RC1, RC2 in respective wavelength bands, e.g. around respective wavelengths λ1 and λ2. The optical data receiver 120 is configured to receive and demodulate the two data-modulated optical carriers RC1, RC2 to generate the corresponding demodulated digital data streams RS1 and RS2. For a portion of a data-modulated optical carriers RC1, RC2 a corresponding segment of the demodulated digital data stream RS1, RS2 is generated.

On the optical data receiver side, the add-on card 130 may include:

- digital circuitry 131 for applying a first delay (e.g. a coarse delay) to one (here RS1) of the demodulated digital data streams RS1 and RS2 to generate a first delayed digital data stream DS1;
- digital circuitry 132, in some embodiments, for applying a second delay (e.g. a fine delay) to the first delayed digital data stream DS1 to generate a second delayed digital data stream DD1; and
- digital circuitry 135, in some embodiments, for determining and adjusting the value of the second delay by comparing the demodulated digital data stream RS2 with the first delayed digital data stream DS1.

In the various embodiments, the optical data receiver includes:

- selection digital circuitry 138 configured to make selections between temporally corresponding portions of the first and second data-modulated optical carriers RC1, RC2 to generate a corresponding portion of the output digital data stream RS based on a control signal from the control circuitry 139; and
- electronic control circuitry 139 configured to receive one or more quality indicator values QI obtained for at least one of the temporally corresponding portions and to generate a control signal for the selection circuitry 138.

The selection digital circuitry 138 may for example be configured to make selections between corresponding demodulated segments of the demodulated digital data stream RS2 and the second delayed digital data stream DD1, where corresponding demodulated segments are demodulated respectively from the temporally corresponding portions of the first and second data-modulated optical carriers RC1, RC2.

An advantage of this embodiment is that the add-on card 100A (and likewise the add-on cards 130, 170) can be plugged into the existing optical data receiver and/or transceiver, from various vendors, which share the same standardized client interfaces (inputs/outputs).

FIG. 2B shows a second embodiment in which an optical data transceiver 100B, which has the capability to transmit data at two different wavelengths includes circuitry for implementing spectral and time diversity, is used. The optical data transceiver 100B incorporates the digital duplicate/delay functions (circuitry 170), for an input data stream, and the receiver delay/selection digital functions (circuitry 130) for the data streams demodulated from optical signals received in two different wavelength channels.

The elements (signals and circuitry) shown in this figure that correspond to those described by reference to FIG. 2A have the same reference signs than in FIG. 2A. The description made by reference to FIG. 2A for these elements is applicable to those of FIG. 2B and will not be repeated for the sake of brevity.

FIG. 2C shows a third embodiment in which an optical data transceiver 100C which has the capability to transmit data at two different wavelengths includes electronic circuitry for implementing spectral and time diversity. The optical data transceiver 1000 incorporates the optical data transmitter duplicate/delay functions (circuitry 170), for an input data stream, and the receiver delay/selection digital functions (circuitry 130) for the data streams demodulated from optical signals received in two different wavelength channels.

The elements (signals and circuitry) shown in this figure that correspond to those described by reference to FIG. 2A have the same reference signs than in FIG. 2A. The description made by reference to FIG. 2A for these elements is applicable to those of FIG. 2C and will not be repeated for the sake of brevity.

The difference with the embodiment of FIG. 2B is that, on the optical data receiver side, only one delay 136 is used (instead of two delays 131, 132 as in FIGS. 2A and 2B). The optical data transceiver 100C includes in this case:

- digital circuitry 136 for applying a delay to one (here RS1) of the demodulated digital data streams RS1 and RS2 to generate a delayed digital data stream DD1; and
- digital circuitry 135 for determining and adjusting the value of the delay of digital circuitry 136 by comparing the demodulated digital data stream RS2 with the demodulated digital data stream RS1.

The one-delay embodiment of FIG. 2C may also be used with an add-on card implementation as described in FIG. 2A.

For the embodiments of FIGS. 2A to 2C, the digital circuitry 135 for determining and adjusting the value of a delay by comparing two digital data streams may be implemented for example by a digital signal processor which compares the two digital data streams. Whether one or two delays are used at receiver side, the total value of the delay is the value that allows to compensate for the relative delay ΔT introduced at receiver side and to temporally align corresponding segments of the two digital data streams DD1 and RS2 (after application of the one or two delay e.g. by circuitry 131, 132 or 136) so as to provide temporally corresponding segments of the two digital data streams DD1 and RS2 to the selection circuitry 138, where the corresponding segments are demodulated from temporally corresponding portions of the first and second data-modulated optical carriers.

The comparison may use a correlation analysis (e.g. to find the value of the delay for which the correlation is the highest). The comparison may use a comparison of data packet identifiers in these two digital data streams (e.g. to find corresponding identifiers and compute the value of the delay corresponding to the difference in number of packets). It is to be noted that the value or the delay may be positive or negative or zero.

For enabling bi-directional free-space optical links with the embodiments of FIGS. 2A and 2B, the value of the relative delay ΔT applied at the optical data transmitter side by the digital circuitry 171 may be used as the value of the first delay applied at the optical data receiver side by digital circuitry 131. In this case, the value for the second delay (residual delay δT) applied at the optical data receiver side by digital circuitry 132 is determined and adjusted by comparing the demodulated digital data stream RS2 with the first delayed digital data stream DS1 to generate temporally align corresponding segments of the two digital data streams DD1 and RS2.

With the embodiment of FIG. 2C, the value for the delay applied at the optical data receiver side by digital circuitry 136 is determined and adjusted by comparing the demodulated digital data stream RS2 with the demodulated digital data stream RS1 to temporally align corresponding segments of the two digital data streams DD1 and RS2. The relative delay ΔT applied at the transmitter side by the digital circuitry 171 is not needed to configure the digital circuitry 136.

For all embodiments, including those of FIGS. 2A to 2C, the digital selection circuitry 138 may work as follows.

A quality indicator is used to select one of temporally corresponding portions of the two data-modulated optical carriers RC1 and RC2 for generating a corresponding portion of the output digital data stream RS. The quality indicator of a portion of a data-modulated optical carrier may be a measure of a power of a portion of a received data-modulated optical carrier from which the concerned portion of the digital signal has been demodulated. A quality threshold may be set for the quality indicator and used by the control circuitry 139 to generate a control signal for the selection circuitry 138.

The quality indicator of a portion of a data-modulated optical carrier may be a measure of a power of a portion, e.g., a temporally-averaged optical power, of the concerned received data-modulated optical carrier. The quality threshold may be set based on a minimum average received optical power value that allow the decoding without error of the corresponding portion of the data-modulated optical carrier.

The quality indicator of a portion of a data-modulated optical carrier may be an indicator of a decoding error (e.g. a bit error rate, a binary value indicative of a success or failure of the decoding, an indicator of a continuity of the received packets, etc) determined during the decoding of the concerned portion of the data-modulated optical carrier to generate a demodulated segment of a digital data stream. The quality threshold may correspond to an error level above which the decoding of the corresponding portion of the data-modulated optical carrier fails.

The two digital data streams DD1 and RS2 are transmitted along similar optical paths or the same optical path with a relative delay ΔT such that a fading event occurring on the optical path at a given time affects the two digital data streams at the same instant during the propagation of the multiplexed optical signal but on distinct segments of the digital data streams. When temporally corresponding portions of the data-modulated optical carrier RC1, RC2 are compared at the optical data receiver side (for example, based on a comparison of demodulated segments of the digital data streams RS2 and DD1 demodulated from the temporally corresponding portions of the data-modulated optical carrier RC1, RC2), the fading event may be detected first in the digital stream RS2 that was delayed at the optical data transmitter side and later in the digital stream DD1 that is in advance with respect to the other.

In a first embodiment, the digital selection circuitry 138 may be configured to select the portion of the data-modulated optical carrier for which the quality indicator value is the highest, i.e., being indicative of a probable higher quality.

In a second embodiment, the digital selection circuitry 138 may be configured to select by default the data-modulated optical carrier RC2 that has been delayed with respect to the other at optical data receiver side. In the second embodiment, when the quality indicator value decreases below a quality threshold (e.g. indicating a fading event) for a given portion of the default data-modulated optical carrier RC2, the digital selection circuitry 138 may be configured to select the temporally corresponding portion of the other data-modulated optical carrier RC1, which is likely to have a higher quality. The digital selection circuitry 138 may be configured to select the temporally corresponding portion of the other data-modulated optical carrier RC1 in response to the quality indicator value of the portion of the other data-modulated optical carrier RC1 being above the threshold. Once the fading event terminates and the quality indicator value is again above the quality threshold for a next portion of the default data-modulated optical carrier RC2, the digital selection circuitry 138 may be configured to select again the next portion of the default data-modulated optical carrier RC2, e.g. in order to avoid the occurrence of the same fading event in the other data-modulated optical carrier RC1.

The adjustment of the relative delay ΔT applied at the optical data transmitter side and compensated at the optical data receiver side may take into account several parameters. If the delay is too short, the same segments of the digital data stream will be affected by the turbulence and time diversity will not be efficient. Thus, the relative delay ΔT may be selected to be greater than the average or maximum duration during which the received optical power is lower than the required value for data demodulation therefrom. The determination of the duration of the relative delay ΔT may account for:

- the average or maximum duration of the attenuation peaks of the received optical power caused by the atmospheric turbulence; hereafter designated as the fading duration;
- the delay introduced by the digital signal processing (DSP) and Forward Error Correction (FEC) chains to reach its steady state after a signal interruption (recovery time), hereafter designated as the DSP recovery time; and/or
- the framer delay which arises due to a specific block called framer that is configured to generate frames form the output of the FEC by encapsulating the decoded data into bit chunks corresponding to frames for proper re-synchronisation of received bits.

Here we define the framer delay as the minimum time required for the framer to recover the frames in the correct form once the DSP chain has converged.

The relative delay ΔT to be applied at the optical data transmitter side and compensated at the optical data receiver side between the two digital data streams may be adjusted, e.g., to be greater than the sum of the fading duration, the DSP+FEC recovery time and the framer delay.

In practice, the relative delay ΔT may be of the order 10 ms-100 ms. This relative delay could be an adjustable parameter and could be set to a value which implements a compromise between reducing the introduced latency and improving the decoding rate (or availability) in case of air turbulence. This parameter could be transmitted from the optical data transmitter in one of the free header blocks of a frame (for example, an Ethernet frame) and then, extracted therefrom by the optical data receiver.

Each delay function of digital circuitry 131, 132, 136, 171 may be implemented in the form of a buffer function, typical in FPGA. For example, the relative delay ΔT applied at the optical data transmitter side by digital circuitry 171 and compensated at receiver side by digital circuitry 131 is between 10 ms and 100 ms. The buffer size is of 100 Mbits for instance with a relative delay ΔT (and coarse delay) of 10 ms and for 10 Gbits/s bit rate. This buffer size can easily be achieved with state-of-the-art memories.

Concerning the rate for making the selections, the rate should not be too slow with respect to the typical fluctuations in received optical power as shown in FIG. 1A in order to be able to take into account fast variations. The typical maximum selection rate may be of the order of 1 ms. Also, as the digital data stream may carry data packets or data frames, it is possible, for example, to make a selection decision per packet/frame (i.e. with a selection rate of a few microseconds) that appears to be a minimum selection rate. In practice, it is possible to make a selection decision per a given fraction of the received packets/frames or for a given number of packets/frames.

FIGS. 3A and 3B show example embodiments that can be used to implement an optical data receiver 120 for two wavelength bands, e.g., for coherent optical detection. In the embodiment of FIG. 3A two optical data receivers 121, 122 are used, where each optical data receiver implements a decoding, digital signal processing chain for a corresponding one of the two data-modulated optical carriers RC1, RC2. In the embodiment of FIG. 3B, a dual-wavelength optical data receiver implements the two decoding signal processing chains with a dual optical front-end for optically and analog processing of the two received data-modulated optical signals in different wavelength bands. Each decoding signal processing chain includes the optical front-end (FE), a Digital Signal Processing (DSP) for digitally processing the digital series of measurements of each received data-modulated optical signal, and Forward Error Correction (FEC) digital circuitry.

Each of the embodiments of FIGS. 3A and 3B can be used with any embodiment described herein, for example by reference to FIG. 2A-2C.

The optical front-end (FE) of an optical receiver is a set of elements that allows the optical and analog conversion of a received data-modulated optical signal into a sequence of digital measurements of said received optical signal.

In a optical data receiver, the optical front-end may include one or more optical mixers (e.g., parallel sets of 90-degree optical hybrids), parallel set(s) of photodiodes (e.g., balanced-pair(s) of matched photodiodes) and analog-to-digital converters. For optical signals modulated in phase and/or amplitude and on two orthogonal polarization states, the data-modulated optical signal may have four detection dimensions: in-phase and quadrature-phase components of the data-modulated optical carrier, for each of 2 orthogonal polarization components. Also, a parallel set of optical mixers may then, create, separately for each wavelength-channel, different interfering mixtures of the received data-modulated optical signal and a local optical oscillator signal, for the wavelength channel, to enable separate measurements of the different phase and polarization components of the received data-modulated optical signal by balanced pairs of matched photodiodes connected for differential detection. The analog-to-digital converters then convert the 4 parallel analog currents produced by the photodiode detector into a sequence of 4 digital signal streams, for each of the first and second optical wavelength channels.

The digital signal processing (DSP) implements a signal processing chain. The purpose of such digital operations is to digitally compensate for undesired optical propagation effects that have affected the data-modulated optical signal during its propagation and/or measurement thereof. Typical examples of such digital operations may include "polarization demultiplexing" and/or compensation for polarization rotation compensation. Other blocks in the digital signal processing chain may, for example, compensate for the frequency difference between the optical carrier of the received data-modulated optical signals (at 2 wavelengths) and the local oscillators for the 2 wavelengths, which mix therewith in coherent versions of the optical data receiver.

The FEC digital circuitry performs corrections of detected transmission bit errors, e.g., based on additional bits added to the input digital stream at the optical data transmitter side. At the transmitter, the encoding may performed with insertion of additional parity bits for use in bit error correction at the optical data receiver. For example, such added parity bits may be used for detecting probable bit errors in the decoded digital bit stream.

FIGS. 4A and 4B show example embodiments that can be used to implement an optical data transmitter 160 for two optical wavelength bands. In the embodiment of FIG. 4A two optical data transmitters 161, 162 are used, where each optical data transmitter implements an encoding signal processing chain for one of the two digital data streams TS1, DS2 carrying the same digital data sequence. In the embodiment of FIG. 4B, a dual-wavelength optical data transmitter implements two encoding signal processing chains with a dual optical front end. At the optical data receiver side, each decoding signal processing chain includes an optical front-end (FE), a Digital Signal Processor (DSP) and a forward error correction (FEC) circuitry.

Each of the embodiments of FIGS. 4A and 4B can be combined with any embodiments of the apparatus described herein, e.g. by reference to FIG. 2A-2C and/or FIGS. 3A-3B.

Concerning the determination of the quality indicator values several example embodiments are disclosed by reference to FIGS. 5A to 5C. Each of these embodiments can be combined with any embodiments of the apparatus described herein, e.g. by reference to FIG. 2A-2C and/or FIGS. 3A-3B and/or FIGS. 4A-4B.

The quality indicator for a portion of a data-modulated optical carrier may be a measure of a time-averaged received optical power of the concerned portion. An optical power detector may be used for generating such a measure of a power. The control circuitry 139 may be configured to obtain the measure of a power, to compare it to a threshold and to generate a control signal for the selection circuitry 138.

According to an example illustrated by FIG. 5A, an optical splitter 181 is configured to extract a portion of one or the optical carrier RC2 and an optical power detector is configured to generate a signal representative of the received optical power of the concerned portion of the optical carrier RC2. The optical power detector may typically be or include a photodiode. The photodiode may be integrated to the add-on card 100A or placed elsewhere. This photodiode may for example be placed between the receiver telescope for receiving the optical signal RW and the input of the optical data receiver. It is to be noted that it may not be necessary to separately monitor the received optical power on the two data-modulated optical carriers RC1 and RC2 as they may be approximately equal, at any instant.

Since a small fraction of the optical power (about 1%) of one or both of the data-modulated optical carriers C1 and C2 may be used for such monitoring of the received optical power, the lost optical signal for data demodulation may be small. For example, it is possible for example to monitor the received optical power of the data-modulated optical carrier C2, in embodiments for which the data-modulated optical carrier C2 is the default optical signal used for data demodulation in response to a high received optical power.

The quality indicator for a portion of a data-modulated optical carrier may be an indicator of a decoding error level, e.g., generated by a FEC circuitry when decoding the concerned portion. The indicator may be a number of uncorrected code blocks at the FEC stage, per unit time, or a flag when a data packet is not decoded.

According to an example illustrated by FIG. 5B, a processor 183 may be configured to obtain values of the indicator of the decoding error claims from the FEC circuitry that generates the digital data stream RS2. Likewise, the processor 183 may be configured to obtain values of the indicator of the decoding error claims from the FEC circuitry that generates the digital data stream RS1. The processor 183 may be configured to provide these values of the indicator to the control circuitry 139 that generates on this basis a control signal for the digital selection circuitry 138. The processor 183 may also analyze the number of uncorrected code blocks and generate a binary value for the control circuitry 139 that generates on this basis a control signal for the selection circuitry 138.

According to an example illustrated by FIG. 5C, a processor 184 may be configured to extract values of the indicator of the decoding error claims from the decoded digital data stream RS2. Likewise, the processor 184 may be configured to extract values of the indicator of the decoding error claims from the decoded digital data stream RS1.

The processor 184 may be configured to provide these values of the indicator to the control circuitry 139 that generates on this basis a control signal for the selection circuitry 138. The processor 184 may also analyze the number of uncorrected code blocks and generate a binary value for the control circuitry 139 that generates on this basis a control signal for the digital selection circuitry 138.

For example, the decoded digital data stream RS1 or RS1 may carry Ethernet packets or OTN packets. These encapsulated packets may have a standardized frame format. In the two most currently used formats for OTN and Ethernet protocols, both consist of different sets of blocks that allow to identify and track the loss of signal (LOS). These blocks may be used to detect the signature of burst frame losses. For OTN protocol, blocks which are unassigned may be used as a signature to indicate the number of lost blocks. For Ethernet packets, a packet identifier or packet number may be present or inserted in each packet at the transmitter side in a data block. The packet identifiers or numbers may be used at the optical data receiver side to compute a number of lost packets, per unit time.

FIG. 6 illustrates the effect on the normalized mutual information (proportional to post-FEC bit error rate) before and after forward error correction with duplication and switching between 2 versions of the data stream. transmitted in different optical wavelength channels, after transmission through the atmosphere.

The example considers a ground to satellite optical transmission with duplication of the transmitted information on 2 wavelengths, wherein the information is delayed by a relative delay $\Delta T=10$ ms. The received optical power is the one shown in FIG. 1A which corresponds to a typical scenario for ground to geostationary satellite communication. As illustrated by FIG. 1C, the optical launched power with spectral and time diversity can be reduced from 300 W to about −60 W (2×30 W per wavelength), that is 5 times smaller than in absence of duplication and switching for the targeted rate of 99% of availability. With the time diversity, the link availability after channel selection is increased with respect to the availability of each channel wavelength separately.

From the received optical power, the mutual information after error correction is obtained. When the received optical power is below the receiver sensitivity threshold of about −45 dBm (typical), the post-FEC bit error rate is around 0.5 and the digital data stream cannot be decoded at all (information lost) (FIG. 6A). When the received optical power is above the receiver sensitivity threshold, the post-FEC bit error rate is 0 (the packets are properly decoded), the link is available and the digital data stream can be decoded (FIG. 6B). Therefore, the block corresponding to FEC decoding can output an indicator of the fidelity of the decoding process which may be used as quality value indicator.

In the various architectures disclosed herein there is no need to modify terrestrial transmitter and receiver front-end used in WDM transmission systems. At the physical layer, the solution relies on the transmission of 2 (or more) WDM channels. Each channel is processed by its own transceiver as in terrestrial WDM system, without any hardware modification.

There is no need to modify the transmitter and receiver digital signal processing chains. There is no need for duplication of the telescopes at the ground station or on the satellite.

The solution is agnostic to the signal characteristics. As the architecture operates on the client digital data streams before/after modulation/demodulation, it works independently of the physical layer signal properties (modulation format, symbol rate, signal entropy, polarization diversity . . . ).

In a bent-pipe optical link scenario, there is no need to modify the satellite on-board equipment. As the turbulence mitigation is done exclusively on-ground in that case, there is no need for to onboard any additional on-board equipment on the satellite. A major advantage in that case is the absence of the need for spatialization of terrestrial coherent terminals including ASICs.

The various architectures disclosed herein enable a strong reduction in required optical launched power which makes feasible the transmission of high throughput data stream (+100 Gbps) through the atmosphere. This point is illustrated in the example below.

The client-layer duplicate and switch architecture disclosed herein is suited for any free space optical transmission with potential turbulent air (satellite to ground, HAPS (High Altitude Pseudo Satellite) to ground, HAPS to HAPS, aircraft to aircraft, aircraft to ground, antenna backhaul).

It is applicable to optical bent-pipe links. An optical bent-pipe link connects two locations on Earth via a satellite, one location being a data center. This removes the need for a terrestrial deployment of fiber link/network. Optical bent-pipe links may be used for providing temporary connectivity between two data centers, temporary connectivity with remote stations (boats, planes, offshore facilities), temporary broadband connectivity in disaster area, alternative connectivity in case of failure or planned maintenance of the ground infrastructure etc. . . . .

It should be appreciated by those skilled in the art that any functions, engines, block diagrams, flow diagrams, state transition diagrams, flowchart and/or data structures described herein represent conceptual views of illustrative circuitry.

Each described function, engine, block, step described herein may be implemented in hardware, software, firmware, middleware, microcode, or any suitable combination thereof.

When implemented in software, firmware, middleware or microcode, instructions to perform the necessary tasks may be stored in a computer readable medium that may be or not included in the apparatus. The instructions may be transmitted over the computer-readable medium and be loaded onto the apparatus. The instructions are configured to cause the apparatus to perform one or more functions disclosed herein. For example, as mentioned above, according to one or more examples, at least one memory may include or store instructions, the at least one memory and the instructions may be configured to, with at least one processor, cause the apparatus to perform the one or more functions. Additionally, the processor, memory and instructions, serve as means for providing or causing performance by the apparatus of one or more functions disclosed herein.

The apparatus may be a general-purpose computer and/or computing system, a special purpose computer and/or computing system, a programmable processing apparatus and/or system, a machine, etc. The apparatus may be or include or be part of: a user equipment, client device, mobile phone, laptop, computer, network element, data server, network resource controller, network apparatus, router, gateway, network node, computer, cloud-based server, web server, application server, proxy server, etc.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the apparatus to perform one or more functions disclosed herein for the apparatus.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid-state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function(s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:

(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

ASIC Application Specific Integrated Circuit
DEMUX Demultiplexer
DSP Digital Signal Processing
EDFA Erbium Doped Fiber Amplifier
FE Front End
FEC Forward Error Correction
SATCOM Satellite Communications
MUX Multiplexer
WDM Wavelength Division Multiplexed

The invention claimed is:

1. An apparatus comprising:

an optical data receiver configured to receive first and second data-modulated optical carriers in different wavelength bands via a free space optical link and to generate an output digital data stream from demodulated segments of the first and second data-modulated optical carriers;

wherein the optical data receiver is configured to make selections between temporally corresponding portions of the first and second data-modulated optical carriers for generating successive portions of the output digital data stream;

wherein the optical data receiver is configured to make one of the selections between two of the temporally corresponding portions of the first and second data-modulated optical carriers based on at least one value of a quality indicator obtained for at least one of two temporally corresponding portions;

wherein the optical data receiver is configured to determine a relative delay between the temporally corresponding portions by determining a correlation between demodulated sequences of data values; and wherein the optical data receiver is configured to use the determined relative delay between the temporally corresponding portions in generating the output digital data stream.

2. The apparatus of claim 1, wherein the optical data receiver is configured to make the one of the selections in response to determining that the at least one value of the quality indicator indicates a higher quality for the portion of the selected one of the data-modulated optical carriers than for the temporally corresponding portion of the unselected one of the data-modulated optical carriers.

3. The apparatus of claim 1, wherein the optical data receiver is configured to make one of the selections in response to determining that the at least one value of the quality indicator is a received optical power of said portion of the selected one of the data-modulated optical carriers being larger than a received optical power of said portion of the unselected one of the optical data-modulated carriers.

4. The apparatus of claim 3, wherein the apparatus comprises at least one optical power detector for generating a measure of the received optical power.

5. The apparatus of claim 1, wherein the optical data receiver is configured to make the one of the selections in response to determining that the at least one value of the quality indicator is a bit error rate in said portion of the selected one of the data-modulated optical carriers being lower than a bit error rate in said temporally corresponding portion of the unselect one of the data-modulated optical carriers.

6. The apparatus of claim 1, wherein the optical data receiver comprises forward error correction circuitry configured to generate indicators of decoding error for recovering digital data from the first and second data-modulated optical carriers; and wherein the quality indicator is determined based on said indicators of decoding error.

7. The apparatus of claim 1, comprising an optical data transmitter configured to transmit the first and second data-modulated optical carriers to the free space optical link, the optical data transmitter being configured to cause the first and second data-modulated optical carriers to carry a same input digital data stream.

8. The apparatus of claim 7, wherein the optical data transmitter is configured to transmit the temporally corresponding portions of the first and second data-modulated optical carriers to the free space optical link with a relative time delay.

9. A method comprising an optical data receiver receiving first and second data-modulated optical carriers in different wavelength bands via a free space optical link and generating an output digital data stream from demodulated segments of the first and second data-modulated optical carriers;

wherein the optical data receiver makes selections between temporally corresponding portions of the first and second data-modulated optical carriers for generating successive portions of the output digital data stream;

wherein the optical data receiver makes one of the selections between two of the temporally corresponding portions of the first and second data-modulated optical carriers based on at least one value of a quality indicator obtained for at least one of two temporally corresponding portions;

wherein the optical data receiver determines a relative delay between the temporally corresponding portions by determining a correlation between demodulated sequences of data values;

wherein the optical data receiver is configured to use the determined relative delay between the temporally corresponding portions in generating the output digital data stream.

10. The method of claim 9, wherein the optical data receiver makes the one of the selections in response to determining that the at least one value of the quality indicator indicates a higher quality for the portion of the selected one of the data-modulated optical carriers than for the temporally corresponding portion of the unselected one of the data-modulated optical carriers.

11. The method of claim 9, wherein the optical data receiver makes one of the selections in response to determining that the at least one value of the quality indicator is a received optical power of said portion of the selected one of the data-modulated optical carriers being larger than a received optical power of said portion of the unselected one of the optical data-modulated carriers.

12. The method of claim 11, wherein the optical data receiver comprises at least one optical power detector for generating a measure of the received optical power.

13. The method of claim 9, wherein the optical data receiver makes the one of the selections in response to determining that the at least one value of the quality indicator is a bit error rate in said portion of the selected one of the data-modulated optical carriers being lower than a bit error rate in said temporally corresponding portion of the unselect one of the data-modulated optical carriers.

14. The method of claim 9, wherein the optical data receiver comprises forward error correction circuitry that generates indicators of decoding error for recovering digital data from the first and second data-modulated optical carriers; and wherein the quality indicator is determined based on said indicators of decoding error.

15. The method of claim 9, further comprising an optical data transmitter transmitting the first and second data-modulated optical carriers to the free space optical link, the optical data transmitter causing the first and second data-modulated optical carriers to carry a same input digital data stream.

16. The method of claim 15, wherein the optical data transmitter transmits the temporally corresponding portions of the first and second data-modulated optical carriers to the free space optical link with a relative time delay.

* * * * *